(12) United States Patent
Le et al.

(10) Patent No.: US 6,874,120 B2
(45) Date of Patent: Mar. 29, 2005

(54) METHOD, SYSTEM, AND PRODUCT FOR EFFICIENT RETRIEVAL OF INFORMATION RELATED TO DATA INPUT INTO A DATA ENTRY FORM FROM THE DATA ENTRY FORM

(75) Inventors: Hanh Kim Le, Austin, TX (US); Gongxian Liu, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 744 days.

(21) Appl. No.: 09/826,741

(22) Filed: Apr. 5, 2001

(65) Prior Publication Data

US 2002/0147743 A1 Oct. 10, 2002

(51) Int. Cl.[7] .............................................. G06F 17/24
(52) U.S. Cl. ....................................................... 715/507
(58) Field of Search .............................. 715/507, 505; 707/10; 705/26

(56) References Cited

U.S. PATENT DOCUMENTS

| | | | |
|---|---|---|---|
| 5,715,432 A | 2/1998 | Xu et al. .................... 395/500 |
| 5,794,259 A * | 8/1998 | Kikinis ....................... 715/507 |
| 5,873,069 A | 2/1999 | Reuhl et al. .................. 705/20 |
| 5,991,534 A | 11/1999 | Hamilton et al. ........... 395/701 |
| 6,088,700 A * | 7/2000 | Larsen et al. ................ 707/10 |
| 6,131,814 A | 10/2000 | Swartz ................... 235/472.01 |
| 6,192,380 B1 * | 2/2001 | Light et al. .................. 715/505 |
| 6,199,079 B1 * | 3/2001 | Gupta et al. ................. 715/507 |
| 6,490,601 B1 * | 12/2002 | Markus et al. .............. 715/507 |
| 6,662,340 B2 * | 12/2003 | Rawat et al. ................ 715/507 |

OTHER PUBLICATIONS http://web.archive.org/web/20001109084100/http://shopping.hp.com/cgi–bin/hpdirect/shopping/scripts/home/start_home.jsp (published on Nov. 9, 2000).*

* cited by examiner

Primary Examiner—Stephen S. Hong
Assistant Examiner—Doug Hutton
(74) Attorney, Agent, or Firm—Duke W Yee; David A. Mims, Jr.; Lisa L. B. Yociss (57) ABSTRACT

A method, system, and product are described for efficiently retrieving information related to data items input into a data entry form displayed on a client computer system. The client computer system is coupled to a server computer system. The server computer system includes a database of a plurality of data items. Each data item has unique information associated with it. A data entry form is displayed on the client computer system. The data entry form includes multiple fields. Input data is received in one of the fields where the input data is one of the data items. The information which is related to this data item is retrieved from the data entry form without accessing the database on the server computer system. This information is then displayed utilizing the data entry form.

15 Claims, 7 Drawing Sheets

Figure 1

PRIOR ART

Figure 2

PRIOR ART

Figure 3

PRIOR ART

Figure 4

PRIOR ART

METHOD, SYSTEM, AND PRODUCT FOR EFFICIENT RETRIEVAL OF INFORMATION RELATED TO DATA INPUT INTO A DATA ENTRY FORM FROM THE DATA ENTRY FORM

BACKGROUND OF THE INVENTION

1. Technical Field

The present invention relates generally to the field of graphical user interfaces for computer based systems for data entry screens and other types of form completion. Still more particularly, the present invention relates to online form completion in which a plurality of fields are to be completed, where information related to data entered into the online form is retrieved from the form itself.

2. Description of Related Art

Graphical user displays on electronic devices such as computers, web browsers, personal digital assistants, and wireless communications devices are common in the art. As these devices become more and more integral to activities in the daily lives of people such as web browsing, word processing, and even making telephone calls, the efficiency and ergonomics of these interfaces are extremely important. A user will quickly notice whether one user interface is easier and quicker to use than another based upon the number of operations required to perform a certain task. Further, the level of "intuitiveness" implemented in the user interface can greatly increase the usefulness and speed with which the user can operate the device.

Many graphical user interfaces follow the same conventions for navigation and selection of controls on the user interface. Such common graphical user interfaces ("GUI") include windows or frames-type displays in Microsoft's Windows operating system, UNIX operating system, IBM's OS/2 and AIX operating systems, Microsoft's Windows CE operating system, Apple Computer's operating system, and many "proprietary" windows-like GUI's on various devices such as PDA's, cell phones, electronic organizers, etc.

Figure 1:
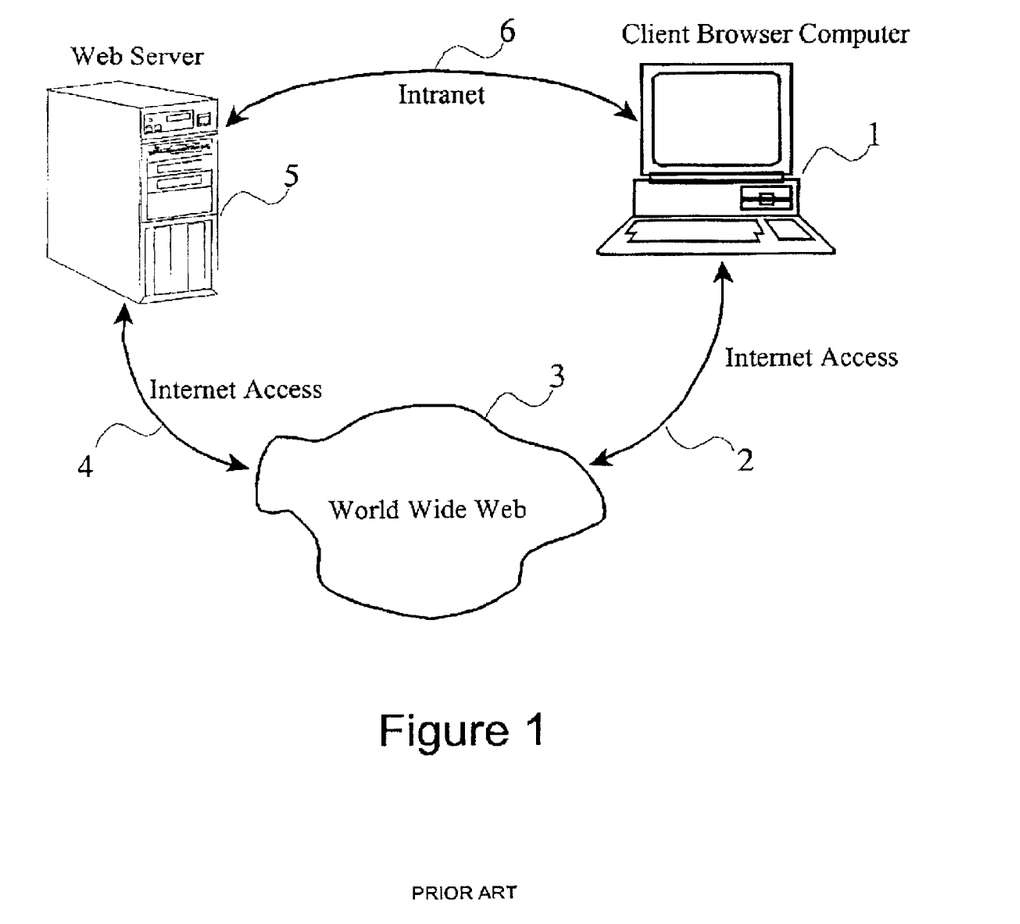
FIG. 1 depicts a typical client-server computer network in accordance with the prior art.

FIG. 1 illustrates a fundamental client-server arrangement of Internet and intranet communications. A client web browser computer 1 is provided with Internet access 2 to the World Wide Web 3 through common means such as a dial-up telephone line and modem, cable modem, or local area network ("LAN"). The web browser computer 1 is also provided with appropriate web browsing software, such as Netscape's Navigator or Microsoft's Explorer. A web server computer 5 is likewise provided with Internet access 4 to the World Wide Web 3 using similar means, or higher-bandwidth means such as T1 and T3 data lines, and a web server suite of software. Alternatively, client and servers may be interconnected via an Intranet 6, such as a corporate LAN. These arrangements are well known within the art.

Hyper Text Markup Language ("HTML"), Adobe's Portable Document Format ("PDF"), and other web documents provide "hyperlinks" within the document, which allow a user to select another document or web site to view. Hyperlinks are specially marked text or areas in the document which when selected by the user commands the browser software to retrieve or fetch the indicated document. For example, the text: <A HREF="http://www.patents.ibm.com">VIEW PATENTS</A> when embedded into an HTML document will produce a specially marked or highlighted string of text in the web browser window which simply reads "VIEW PATENTS". Most commonly, this text will appear in underlined blue text, but the HTML document may specify alternate display characteristics for hyperlinks. If the web browser user selects the hyperlink, such as by clicking on the hyperlink using a mouse, the web browser will request the base document from web address www.patents.ibm.com using HTTP commands. The appropriate server for this web address will respond to the request by transmitting a web document, such as index.htm, to the requesting web browser.

Ordinarily, when the user selects a plain hyperlink, the current page being displayed in the web browser's graphical user interface ("GUI") window disappears and the newly received page is displayed. If the parent page is an index, for example the IBM web site www.patents.ibm.com, and the user wishes to visit each descending link (e.g. read the document with tips on how to use the site), then the parent or index page disappears and the new page is displayed (such as the help page). The user must click the browser's "back" button to return to displaying the parent page if desired.

Figure 2:
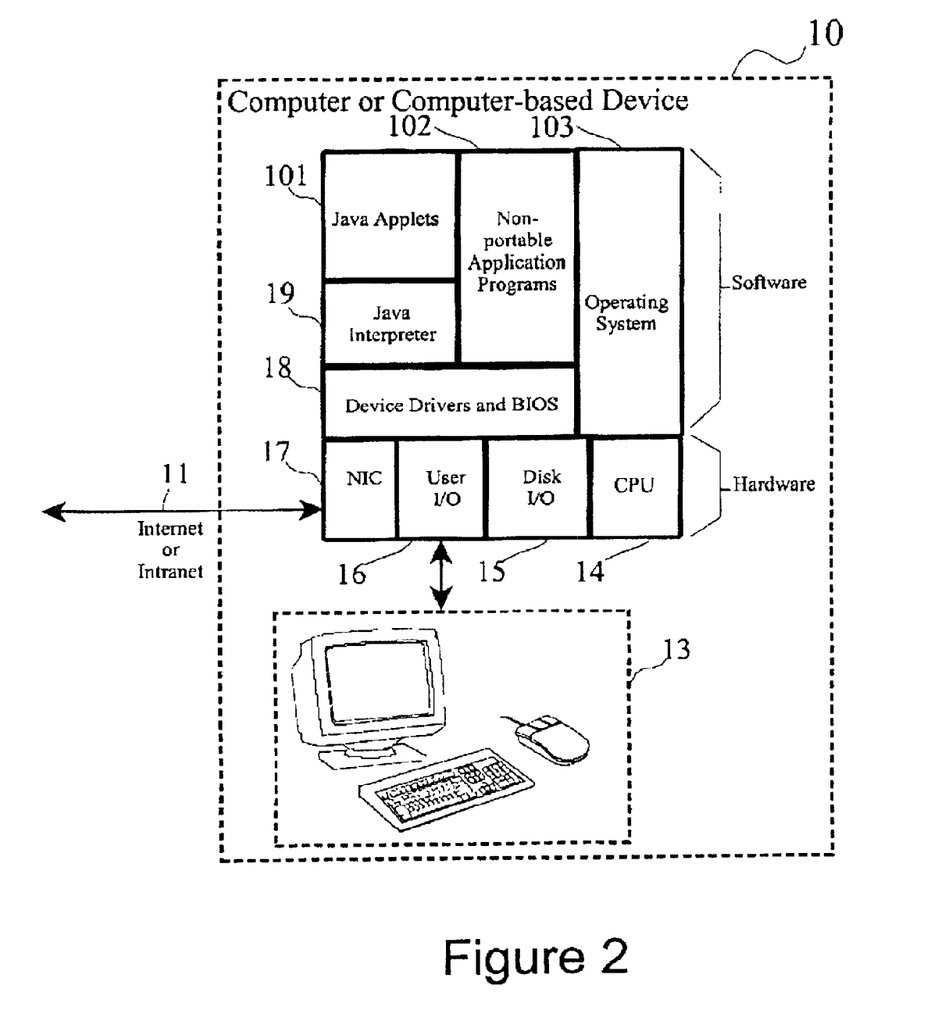
FIG. 2 illustrates a block diagram of a computer system in accordance with the prior art.

FIG. 2 depicts a basic organization of many prior art computer systems, web browsers, and other computer-based devices. System 10 typically includes a microprocessor or central processor unit ("CPU") including computer memory, and may also include interfaces to hard disks and removable disk media 14, and possibly interfaces to computer or communications networks 17 such as a network interface card ("NIC") or wireless communications interface. Commonly used NICs include Ethernet local area network ("LAN") cards, dial-up modem cards, and wireless communications circuits. Some of these circuits may be provided integral to system 10, such as the case with web-enabled cell phones, or these circuits may be add-in operations such as PCI cards or PCMCIA cards for personal computers.

Additional typical hardware provided in system 10 includes a group of user input/output ("I/O") devices 13, such as a display, keyboard, and/or pointing device, accompanied by common user I/O interface circuits to allow the CPU and system software to access and use user I/O devices 13. Common display devices include VGA and LCD monitors for personal computers, and LCD panels for PDA and cell phones. Common pointing devices include "arrow keys", "tab" keys, mouse and scroll-mouse, joystick, track balls, glide point touch sensitive pads, and touch sensitive displays with stylus pens. Some devices, such as certain PDA's, do not include an actual keyboard, but rather rely upon a touch-sensitive LCD display with virtual pointing device and stylus.

The software functionality of computer-based systems 10 can be divided into low-level device drivers and BIOS 18, an operating system 103, and applications programs. Low-level device drivers provide hardware-specific interface functions which allow the operating system and application programs to access the system hardware through common or generic application program interfaces ("API"). Some device drivers include necessary communications protocols and methods associated with a particular hardware device, such as a modem or wireless communications interface. Application programs can be further divided into portable applications, or applet 101, and non-portable, system-dependent applications 102. Such division of hardware and software functionality is well-understood in the art, and can be applied to large computer systems such as an IBM AS/400 equally as well to small computer systems such as PDA's running Windows CE.

Figure 3:
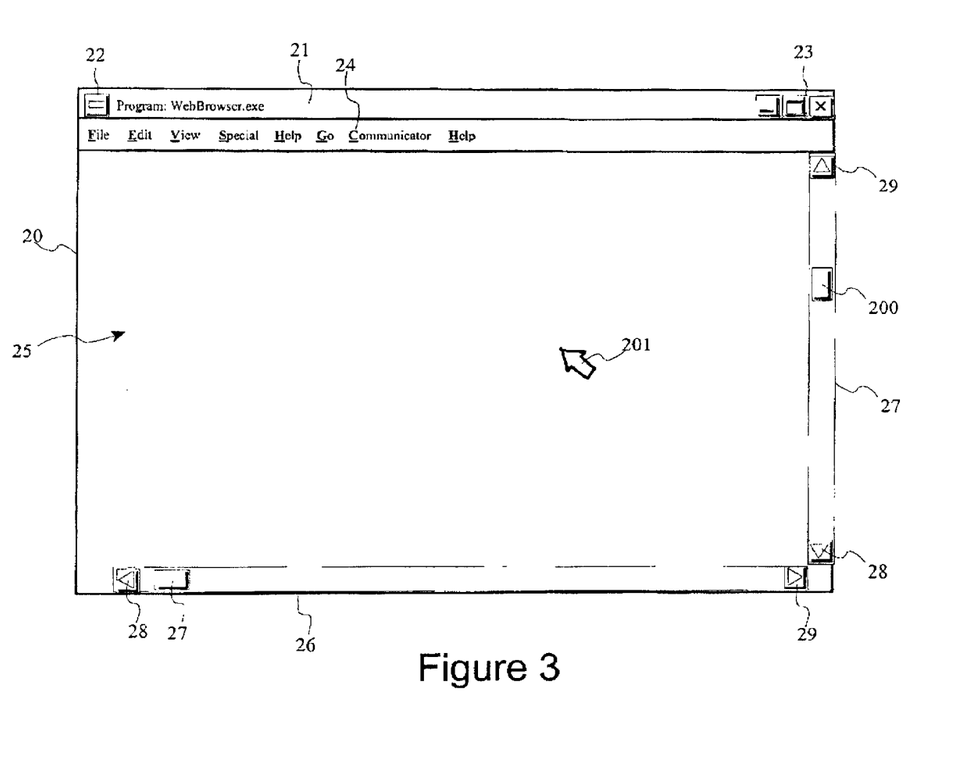
FIG. 3 depicts a graphical user interface frame presented by a web browser in accordance with the prior art.

On the system display is typically shown a conventional frame or "window" of information related to a specific system function or program, such as a web browser. FIG. 3 illustrates a typical arrangement of a web browser frame 20 including a title bar 21, tool bar 24, display area 25, and a pointer 201. Pointer 201 moves in response to the system pointing device and/or keyboard, such as typing on the arrow keys, movement of a mouse, track ball, or joystick. Title bar 21 may include "buttons" for minimizing or restoring frame 23, closing program 22, as well as a display of the name of the function or program. Tool bar 24 typically includes a number of text and/or iconic options, such as "file" and "edit" drop-down lists.

Figure 4:
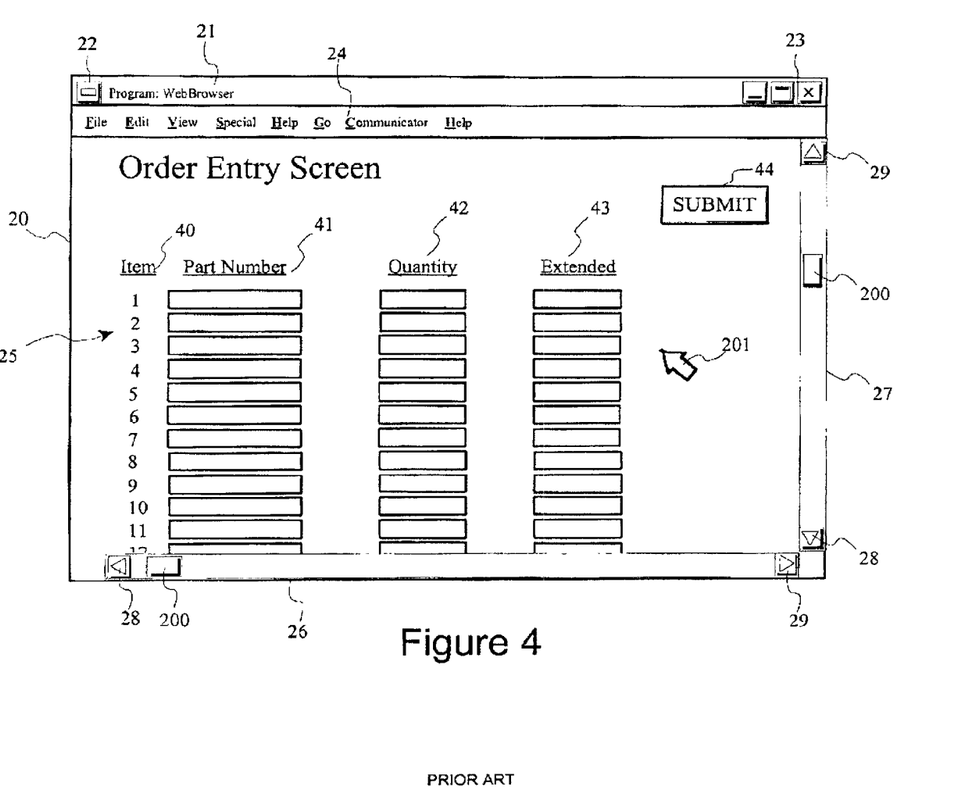
FIG. 4 illustrates an example form with a plurality of fields into which data may be entered in accordance with the prior art.

FIG. 4 depicts an example, on-line form with a plurality of fields into which data may be entered in accordance with the prior art. This form is displayed in a web browser window 20 in display area 25 of window 20. In this example, an order entry form is shown in which each ordered item has an item number 40, a part number or catalog number 41, a quantity of units ordered 42, and an extended calculated price 43. The form is provided with a submit order button 44. In many common technologies on web servers and web sites today, this form would be an HTML form or a common gateway interface ("CGI") form. When the user has completed filling in numbers and information in the fields of the form, the user clicks on or selects the submit button 44 to cause data to be transferred from the user's web browser computer to the web site server.

For example, the user might enter a list of part numbers in order to obtain the current price for each item. In this example, the user must first enter in all part numbers for which a price is to be obtained. The form, including a listing of all of these part numbers, is then submitted to the web server. When the form is submitted, the form, including the list of part numbers, is transmitted to the server.

Once the server receives the form and list of part numbers, the server must retrieve each part number, search a database of part numbers, and locate the price for the part number. This process is repeated for each part number. Web server 5 then transmits these prices back to user's web browser which is executing on user's client computer system 1.

This process is typically not very efficient, especially when a user repeatedly searches the database. For each search, the communications channel, either intranet 6 or Internet 4, must transmit the search request from client 1 to Web server 5, and then must transmit the results of the search back to client 1. Further, web server 5 must execute a search of the database each time it receives a search request.

Therefore, a need exists for a method, system, and product for retrieving and displaying information related to data items entered into a form without searching a database.

SUMMARY OF THE INVENTION

A method, system, and product are described for efficiently retrieving information related to data items input into a data entry form displayed on a client computer system. The client computer system is coupled to a server computer system. The server computer system includes a database of a plurality of data items. Each data item has unique information associated with it. A data entry form is displayed on the client computer system. The data entry form includes multiple fields. Input data is received in one of the fields where the input data is one of the data items. The information which is related to this data item is retrieved from the data entry form without accessing the database on the server computer system. This information is then displayed utilizing the data entry form.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The invention is preferably realized using a well-known computing platform, such as an IBM RS/6000 server running the IBM AIX operating system. However, it may be realized in other popular computer system platforms, such as an IBM personal computer running the Microsoft Windows operating system or a Sun Microsystems workstation running operating systems such as UNIX or LINUX, without departing from the spirit and scope of the invention.

The present invention is preferably realized as a JAVA script for use in a web object such as a hypertext markup language (HTML) page. The JAVA script is executed by the client or browser computer when received with the HTML page or other web object. JAVA scripts are capable of producing displays to users, of receiving input from users, and of combining those operations to produce a form-like user interface or data entry screen. Further, the JAVA script can perform operations on the data received or input, such as range and value checking, calculations, and format checking. JAVA is a well-known programming language, which is especially useful for web design and web programming. Other languages for programming such as C++, are also alternatives for implementation of the invention, depending on the environment of the graphic user interface to be supported.

The present invention is a method, system, and product for efficiently retrieving information related to data items input into an on-line data entry form on a client computer system. The client is coupled to a server computer system. A routine on the client, such as a web browser, first requests the data entry form from the server. The server then downloads the form to the client.

The data entry form includes a plurality of entry fields into which data items may be entered. Each data item is associated with unique information. When the client requests the form, the server will create two strings and store each into its own hidden field within the data entry form. The first string includes each of the plurality of data items separated by delimiters. In this manner, each data item occupies a particular position within the string. The second string includes the information associated with each data item. The information stored in the second string is stored in a position in the second string which corresponds to the location in the first string which its associated data item is stored.

The server then downloads the data entry form which includes a first hidden field wherein the data entry item string is stored, and a second hidden field wherein the information string is stored. These fields are not visible to users.

As a data item is input into one of the fields of the data entry form, the first string is accessed to determine the position of the data item. Using the position of the data item in the first string, an index is determined. This index is then used to locate the position in the second string which corresponds to the position in the first string of the data entry item. The information stored in this position in the second string will be the information which is associated with the data item input into the form.

As each data item is input into the form, the information which is associated with the data item may be acquired from the second hidden field. The process of retrieving associated information is executed only on the client computer system. Therefore, associated information may be retrieved without accessing the database on the server.

Any type of data item and associated information may be utilized. Product numbers and the price for the products represented by the product numbers is one example of data items and associated information. Therefore, when each product number is entered into the data entry form, the price for the product is retrieved from the data entry form itself and displayed to the user without the need for accessing the database on the server.

Figure 5:
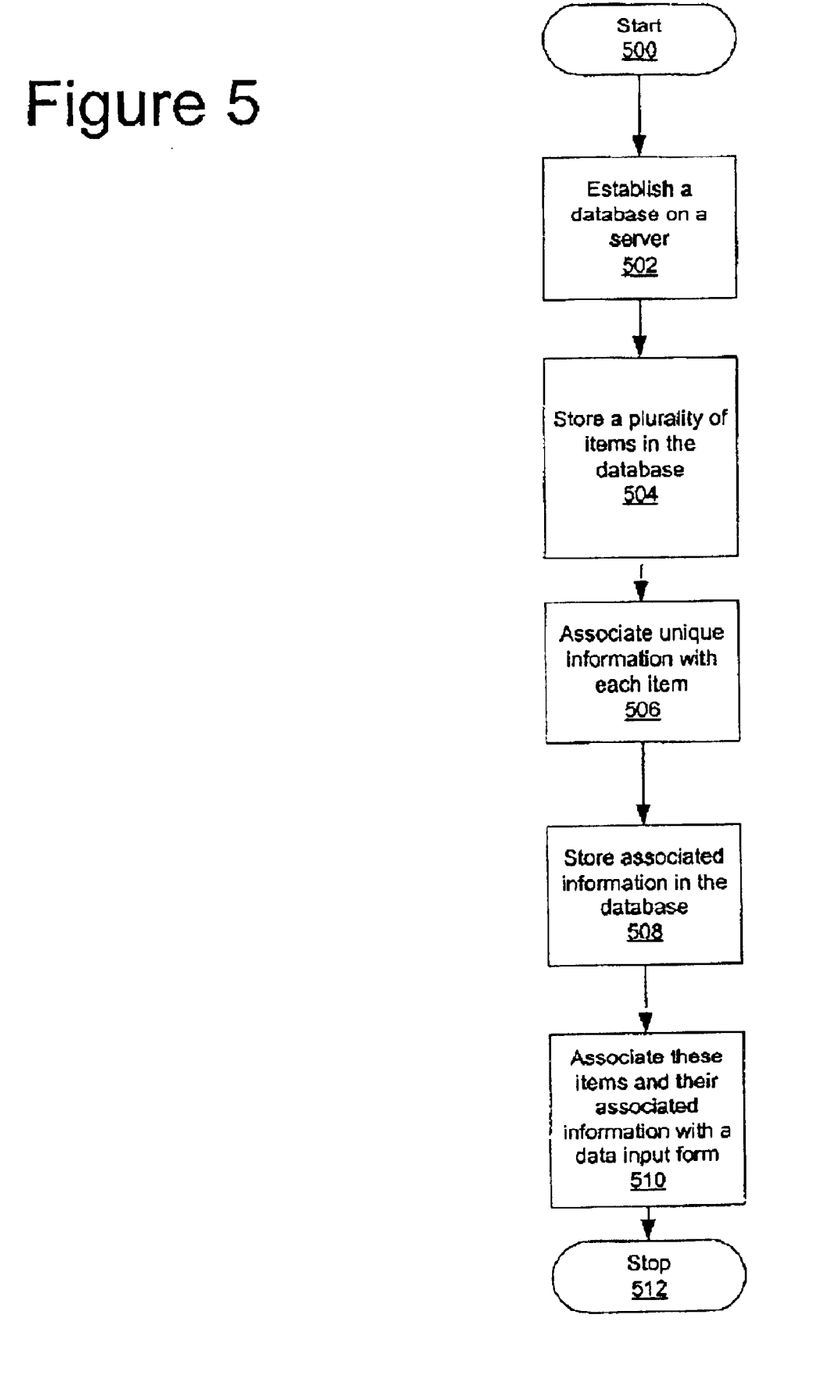
FIG. 5 is a high level flow chart which illustrates establishing a database of a plurality of data items and unique information associated with each data item in accordance with the present invention.

FIG. 5 is a high level flow chart which illustrates establishing a database of a plurality of data items and unique information associated with each data item in accordance with the present invention. The process starts as depicted by block 502 which illustrates establishing a database on a server computer system. Next, block 504 depicts storing a plurality of data items in the database. The data items may be any type of information which might be entered into a form. For example, one common type of data item is a product number. Thereafter, block 506 illustrates associating unique information with each data item. For example, a price might be the information associated with each data item. Block 508, then, depicts the storage of the associated information in the database. Therefore, the database could contain a plurality of different product numbers and the price for the product represented by each product number. Thereafter, block 510 illustrates associating these data items and their associated information with a particular data input form. The process then terminates as illustrated by block 510.

Figure 6:
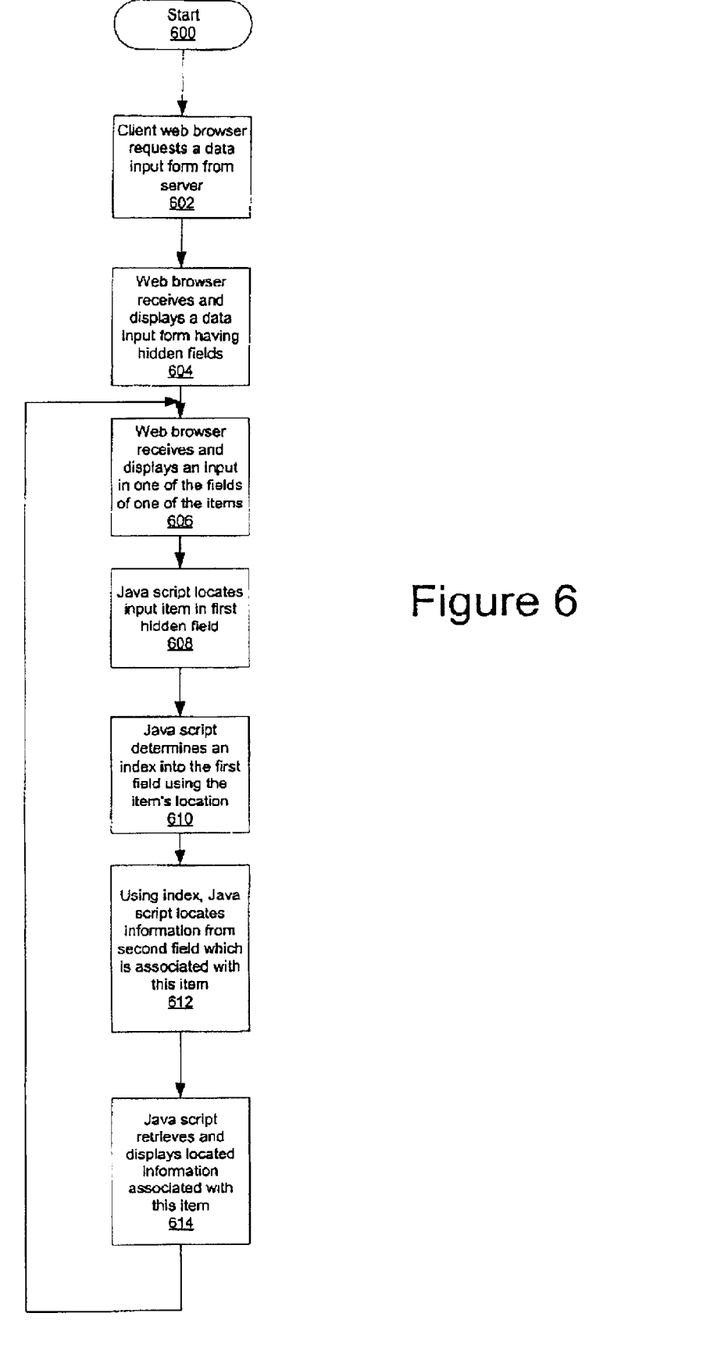
FIG. 6 is a high level flow chart which depicts a routine executing in a client computer system which automatically retrieves and displays information associated with each data item entered into a form without searching the database described in FIG. 5 in accordance with the present invention.

FIG. 6 is a high level flow chart which depicts a routine executing in a client computer system which automatically retrieves and displays information associated with each data item entered into a form without searching the database described in FIG. 5 in accordance with the present invention. The process starts as depicted by block 600 and thereafter passes to block 602 which illustrates a routine which is executing on a client computer system requesting a data input form from a server computer system. For example, a web browser which is executing on the client might request a data input form from a server computer system utilizing the Internet by accessing a particular web page on the server. The process then passes to block 604 which depicts the web browser receiving and displaying the data input form which includes hidden fields of data. Next, block 606 illustrates web browser receiving and displaying an input of one of the data items into one of the fields of the form. Thereafter, block 608 depicts a routine which is executing within the client, such as a Java script routine, locating the input data item within the first hidden field. Next, block 610 illustrates the Java script routine determining an index into the first hidden field using the data item's location within the first field. The process then passes to block 612 which depicts the Java script routine using the index to locate the information in the second hidden field which is associated with this data item. Next, block 614 illustrates the Java script routine retrieving and displaying the located information associated with this data item.

As an example, suppose product A sells for price a, product B sells for price b, product C sells for price c, and product D sells for price d. The first hidden field may then contain the following string of data: "product_A/product_B/product_C/product_D". The second hidden field will then contain the following string of information: "price_a/price_b/price_c/price_d". When a product number is entered, such as product C, the Java script routine will locate product C in the first hidden field and determine an index using the position in the first hidden field where product C was found. Therefore, the index will indicate the third position in the first hidden field. The Java script will then use the index to locate the information which is stored in the second hidden field in the third position. Therefore, the Java script routine will locate "price c" which is stored in the third position in the second hidden field.

In this manner, as each data item is entered into the form, the information associated with the data item is immediately retrieved from the form itself and displayed to the user. The associated information is retrieved utilizing a routine which is executing on the client computer system. The server computer system and the database on the server are not accessed in order to retrieve the associated information.

The process then passes back to block 606.

Figure 7:
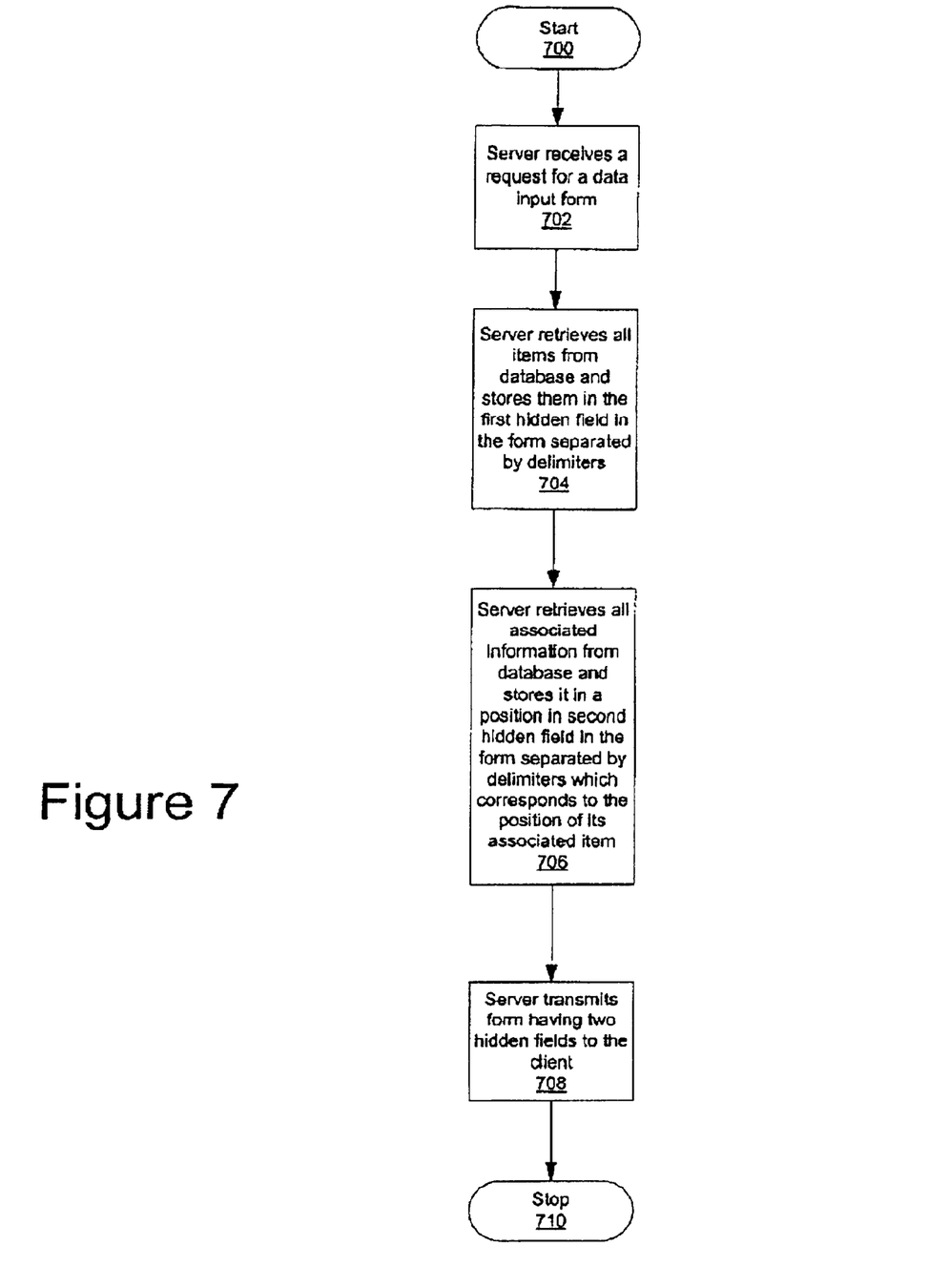
FIG. 7 is a high level flow chart which illustrates a server computer system retrieving data items and their associated information and inserting the data items and information into hidden fields within a form in accordance with the present invention.

FIG. 7 is a high level flow chart which illustrates a server computer system retrieving data items and their associated information and inserting the data items and information into hidden fields within a form in accordance with the present invention. The process starts as depicted by block 700 and thereafter passes to block 702 which illustrates a server computer system receiving a request for a data input form. Next, block 704 depicts the server retrieving all data items from the server's database which are associated with this particular form. These data items are then stored, separated by delimiters, within a first hidden field in the data entry form. Block 706, then, illustrates the server retrieving all associated information from the database and storing the information in a second hidden field in the data entry form. The information is stored in the second hidden field separated by delimiters in a position which corresponds to the position where the data item associated with the information is stored in the first hidden field.

Using the example described above, where product A sells for price a, product B sells for price b, product C sells for price c, and product D sells for price d, the server first stores the data in the first hidden field as a string of data:

product_A/product_B/product_C/product_D". The server then stores the information associated with these data items in the locations in the second hidden field which correspond to the location of the associated data item in the first hidden field. The second hidden field then includes a string of information:

"price_A/price_B/price_C/price_D".

The process then passes to block 708 which depicts the server transmitting this data entry form, including the data items and associated information stored in two hidden fields, to the client computer system. The process then terminates as illustrated by block 710.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a client computer system coupled to a server computer system for efficiently retrieving information, said server computer system including a database storing a plurality of data items and unique information associated with each one of said plurality of data items, said method comprising the steps of:

initially retrieving a data entry form from said database including retrieving information related to said plurality of data items;

displaying, on said client computer system, said data entry form which includes a plurality of fields;

receiving input data for one of said plurality of fields, said input data being one of said plurality of data items;

subsequently retrieving information related to said one of said plurality of data items from said data entry form without again accessing said database after said form was initially retrieved from said database;

displaying said information utilizing said data entry form;

storing, utilizing said server computer system, a plurality of data items in a first field which is hidden in said data entry form, said first field being invisible to users;

storing, utilizing said server computer system, unique information associated with said plurality of data items in a second field which is hidden in said data entry form, said second field being invisible to users;

creating, utilizing said server computer system, a string of data items, said string of data items including said plurality of data items, each one of said plurality of data items being separated by delimiters, wherein each one of said plurality of data items is located in a particular position within said string of data; and creating, utilizing said server computer system, a string of information, said string of information including said information associated with each one of said plurality of data items, wherein said information in said string of information is separated by delimiters, further wherein each said information is located in a particular position within said string of information which corresponds to a position within said string of data where one of said plurality of data items which is associated with each said information is located.

2. The method according to claim 1, further comprising the steps of:

determining a position within said string of data of a first one of said plurality of data items;

utilizing said position to determine an index; and locating information associated with said first one of said plurality of data items utilizing said index.

3. The method according to claim 2, further comprising the steps of:

determining said position within said string of data of said first one of said plurality of data items utilizing a Java script executing on said client computer system;

utilizing said position to determine an index utilizing said Java script executing on said client; and locating information, utilizing said Java script executing on said client, associated with said first one of said plurality of data items utilizing said index.

4. The method according to claim 1, further comprising the steps of:

requesting, utilizing said client computer system, said data entry form from said server computer system; and downloading said data entry form from said server computer system to said client computer system.

5. The method according to claim 1, further comprising the steps of:

displaying said data entry form utilizing a web browser executing on said client computer system; and retrieving information related to said one of said plurality of data items from said data entry form utilizing a Java script excuting on said client computer system.

6. A computer-readable media in a client computer system coupled to a server computer system for efficiently retrieving information, said server computer system including a database storing a plurality of data items and unique information associated with each one of said plurality of data items, said computer-readable media comprising:

instructions for initially retrieving a data entry form from said database including retrieving information related to said plurality of data items;

instruction means for displaying, on said client computer system, said data entry form which includes a plurality of fields;

instruction means for receiving input data for one of said plurality of fields, said input data being one of said plurality of data items;

instruction means for subsequently retrieving information related to said one of said plurality of data items from said data entry form without again accessing said database after said form was initially retrieved from said database;

instruction means for displaying said information utilizing said data entry form;

instruction means for storing, utilizing said server computer system, a plurality of data items in a first field which is hidden in said data entry form, said first field being invisible to user;

instruction means for storing, utilizing said server computer system, unique information associated with said plurality of data items in a second field which is hidden in said data entry form, said second field being invisible to users;

instruction means for creating, utilizing said server computer system, a string of data items, said string of data items including said plurality of data items, each one of said plurality of data items being separated by delimiters, wherein each one of said plurality of data items is located in a particular position within said string of data; and instruction means for creating, utilizing said sewer computer system, a string of information, said string of information including said information associated with each one of said plurality of data items, wherein said information in said string of information is separated by delimiters, further wherein each said information is located in a particular position within said string of information which corresponds to a position within said string of data where one of said plurality of data items which is associated with each said information is located.

7. The computer-readable media according to claim 6, further comprising:

instruction means for determining a position within said string of data of a first one of said plurality of data items;

instruction means for utilizing said position to determine an index; and instruction means for locating information associated with said first one of said plurality of data items utilizing said index.

8. The computer-readable media according to claim 7, further comprising:

instruction means for determining said position within said string of data of said first one of said plurality of data items utilizing a Java script executing on said client computer system;

instruction means for utilizing said position to determine an index utilizing said Java script executing on said client; and instruction means for locating information, utilizing said Java script executing on said client, associated with said first one of said plurality of data items utilizing said index.

9. The computer-readable media according to claim 6, further comprising:

instruction means for requesting, utilizing said client computer system, said data entry form from said server computer system; and instruction means for downloading said data entry form from said server computer system to said client computer system.

10. The computer-readable media according to claim 6, further comprising:

instruction means for displaying said data entry form utilizing a web browser executing on said client computer system; and instruction means for retrieving information related to said one of said plurality of data items from said data entry form utilizing a Java script executing on said client computer system.

11. A client computer system coupled to a server computer system for efficiently retrieving information, said server computer system including a database storing a plurality of data items and unique information associated with each one of said plurality of data items, comprising:

said client computer system for initially retrieving a data entry form from said database including retrieving information related to said plurality of data items:

said client computer system for displaying said data entry form which includes a plurality of fields;

said client computer system for receiving input data for one of said plurality of fields, said input data being one of said plurality of data items;

said client computer system for subsequently retrieving information related to said one of said plurality of data items from said data entry form without again accessing said database after said form was initially retrieved from said database;

said client computer system for displaying said information utilizing said data entry form;

said server computer system for storing a plurality of data items in a first field which is hidden in said data entry form, said first field being invisible to users;

said server computer system for storing unique information associated with said plurality of data items in a second field which is hidden in said data entry form, said second field being invisible to users;

said server computer system for storing a string of data items, said string of data items including said plurality of data items, each one of said plurality of data items being separated by delimiters, wherein each one of said plurality of data items is located in a particular position within said string of data; and said server computer system for storing a string of information, said string of information including said information associated with each one of said plurality of data items, wherein said information in said string of information is separated by delimiters, further wherein each said information is located in a particular position within said string of information which corresponds to a position within said string of data where one of said plurality of data items which is associated with each said information is located.

12. The system according to claim 11, further comprising:

said client computer system for determining a position within said string of data of a first one of said plurality of data items;

said client computer system for utilizing said position to determine an index; and said client computer system for locating information associated with said first one of said plurality of data items utilizing said index.

13. The system according to claim 12, further comprising:

a Java script for determining said position within said string of data of said first one of said plurality of data items;

said Java script for utilizing said position to determine an index; and said Java script for locating information associated with said first one of said plurality of data items utilizing said index.

14. The system according to claim 11, further comprising:

said client computer system for requesting said data entry form from said server computer system; and said server computer system for down loading said data entry form from said server computer system to said client computer system.

15. The system according to claim 11, further comprising:

a web browser executing on said client for displaying said data entry form; and a Java script executing on said client for retrieving information related to said one of said plurality of data items from said data entry form.

* * * * *

UNITED STATES PATENT AND TRADEMARK OFFICE
CERTIFICATE OF CORRECTION

PATENT NO. : 6,874,120 B2  
DATED : March 29, 2005  
INVENTOR(S) : Le et al.

It is certified that error appears in the above-identified patent and that said Letters Patent is hereby corrected as shown below:

Column 7,  
Line 14, delete " "price_A/price_B/price_C/price_D" " and insert -- "price_a/price_b/price_c/price_d" --.

Column 9,  
Line 9, after "invisible to" delete "user" and insert -- users --.  
Line 22, after "said" delete "sewer" and insert -- server --.

Column 11,  
Line 7, after "system for" delete "down loading" and insert -- downloading --.

Signed and Sealed this

Ninth Day of May, 2006

JON W. DUDAS  
*Director of the United States Patent and Trademark Office*